United States Patent
Kinoshita et al.

(10) Patent No.: US 6,326,078 B1
(45) Date of Patent: Dec. 4, 2001

(54) HEAT-SENSITIVE SHEET FOR STENCIL PRINTING

(75) Inventors: Hideyuki Kinoshita; Hiroshi Watanabe; Kenji Yoshida, all of Tokyo (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 09/540,348

(22) Filed: Mar. 31, 2000

(30) Foreign Application Priority Data

Apr. 2, 1999 (JP) .................................................. 11-096065

(51) Int. Cl.$^7$ .............................. B32B 27/12; B32B 27/36
(52) U.S. Cl. ...................... 428/318.4; 428/195; 428/409; 428/480; 428/913
(58) Field of Search ................................ 428/318.4, 195, 428/409, 480, 913

(56) References Cited

FOREIGN PATENT DOCUMENTS

| | | |
|---|---|---|
| 983868 | 3/2000 | (EP) . |
| 985545 | 3/2000 | (EP) . |
| 987124 | 3/2000 | (EP) . |
| 08-067080 | 3/1996 | (JP) . |
| 09-021092 | 1/1997 | (JP) . |
| 10-171148 | 6/1998 | (JP) . |
| 10-324074 | 12/1998 | (JP) . |

*Primary Examiner*—Bruce H. Hess
*Assistant Examiner*—Kimberly T. Nguyen
(74) *Attorney, Agent, or Firm*—Fay Sharpe Fagan Minnich & McKee, LLP

(57) ABSTRACT

Disclosed is a heat-sensitive sheet for stencil printing comprising a laminate of a thermoplastic resin film and a porous support mainly composed of synthetic fibers, the sheet having a wet tensile strength in the machine direction of 200 gf/cm or higher, a KES bending rigidity B value in the machine or cross direction of 0.02 g·cm$^2$/cm or higher, and a PPS smoothness determined when a film is pressed against the surface of the porous support of the sheet of 0.9 $\mu$m or higher; the sheet has an excellent runnability, occurrence of wrinkles on the sheet when it is wound around a drum of a stencil printing machine is efficiently prevented, and elongation of the sheet is repressed and occurrence of wrinkles on the sheet can be prevented even when a large number of paper sheets are printed, and thus printed paper sheets having sharp images excellent in reproducibility of a manuscript can be provided.

10 Claims, 4 Drawing Sheets

HEAT-SENSITIVE SHEET FOR STENCIL PRINTING

TECHNICAL FIELD

The present invention relates to a heat-sensitive sheet for stencil printing. More specifically, the invention relates to a heat-sensitive sheet for stencil printing which causes no jamming in a stencil printing apparatus during feeding and no wrinkle at the time of winding around or loaded on a printing drum, and is not elongated even when a large number of sheets of paper are printed, and thus sharp printed images can be obtained.

(For the purpose of the present invention, the words "sheets of paper" are sometimes referred to as "papers" and the words "sheet for stencil printing" are sometimes condensed to "stencil sheet" or further abbreviated to "the sheet" for brevity.)

BACKGROUND ART

Heretofore, a heat-sensitive sheet for stencil printing was not necessarily satisfactory in definition or sharpness of printed images, particularly in evenness of its solid parts. While various causes can be adduced for such circumstance, a condition ascribable to the fibers which constitute the support can be mentioned as one of the causes.

That is, a tissue paper (thin paper) which is conventionally used as the porous support in a stencil sheet and composed of natural fibers has defects as follows:

Passing of ink is liable to become uneven since diameter of the fibers is comparatively large and uneven, and cross section of the fibers is flat. Particularly, passing of ink is obstructed by the fibers located at directly under perforated portions to cause fading (or blurring) of printed letters, and Smoothness of the surface of a film laminated on the support is deteriorated by the thick fibers, and contact of the film with a thermal head at the time of perforations is poor to often causes deficient perforations, thus, voids are formed in solid printing.

In order to improve these defects, such countermeasures have been proposed that a paper prepared by using a blend of natural (cellulosic) fibers and synthetic fibers such as polyester fibers through a wet papermaking process or a non-woven fabric is used instead of the above mentioned tissue paper composed only of natural fibers to make the fibers in the porous support fine on average or to reduce the basis weight of the paper or fabric (Laid-open Japanese Patent Publication Nos. Sho 59-2896, Sho 59-16793, and Hei 2-67197).

Definition of images is improved by thinning the diameter of fibers in the porous support or reducing the basis weight of the paper or fabric. In this case, however, there occur such problems that runnability of the sheet is lowered to cause jamming in the printing apparatuses during feeding, and that wrinkles occur on the sheet when an unperforated or perforated sheet is wound around and loaded on a printing drum, and the wrinkles degrade the quality of printing. Besides, there is a defect that the sheet is elongated (elongation at printing) or wrinkles occur on the sheet (wrinkles at printing) and thus reproducibility of a manuscript in printed papers is lowered when a number of papers are printed.

Further, in order to improve these defects, a stencil sheet having a specific tensile strength and flexural rigidity, that is, a specified tenacity and stiffness (Laid-open Japanese Patent Publication No. Hei 8-67080), and another stencil sheet having a specific wet elongation when the sheets is stretched under a certain load (Laid-open Japanese Patent Publication No. Hei 5-104875) have been proposed.

However, even when the sheet has the strength and rigidity (stiffness) described above, the effect of preventing the wrinkle occurrence when the sheet is wound around a printing drum is low, and the sheet is not thoroughly satisfied even as to the wrinkle occurrence at printing.

DISCLOSURE OF THE INVENTION

An object of the present invention is to solve the problems in the prior art described above. Another object of the present invention is to provide a heat-sensitive sheet for stencil printing which sheet is excellent in runnability, occurrence of wrinkles on the sheet when the sheet is wound around a drum of a printing apparatus is efficiently prevented, elongation of the sheet is repressed and occurrence of wrinkles on the sheet can be prevented when a large number of papers are printed, and thus printed papers having a sharp images excellent in reproducibility of a manuscript can be obtained.

As a result of diligent investigations by the present inventors with the attention being focused on the mechanism by which wrinkles occur on the sheet when it is wound around a printing drum, the sheet is elongated, and wrinkles occur on the sheet at the time of printing, it has been found out that the problems described above can be solved by specifying the smoothness of the surface of porous support in the sheet and the strength of the sheet, leading to the accomplishment of the present invention.

The present invention is concerned with a heat-sensitive sheet for stencil printing comprising a laminate of a thermoplastic resin film and a porous support mainly composed of synthetic fibers which sheet has a wet tensile strength in the machine direction (longitudinal direction) of 200 gf/cm or higher, a KES bending rigidity B value in the machine direction or cross direction (lateral direction) of 0.02 g·cm$^2$/cm or higher, and a PPS smoothness determined when a film is pressed against the surface of the porous support of the sheet of 0.9 μm or higher.

Now, the mechanisms by which wrinkles occur on a stencil sheet when the stencil sheet is wound around a drum in a printing apparatus, the stencil sheet is elongated at printing, and wrinkles occur on the stencil sheet at printing are described with reference to drawings.

Figure 1:
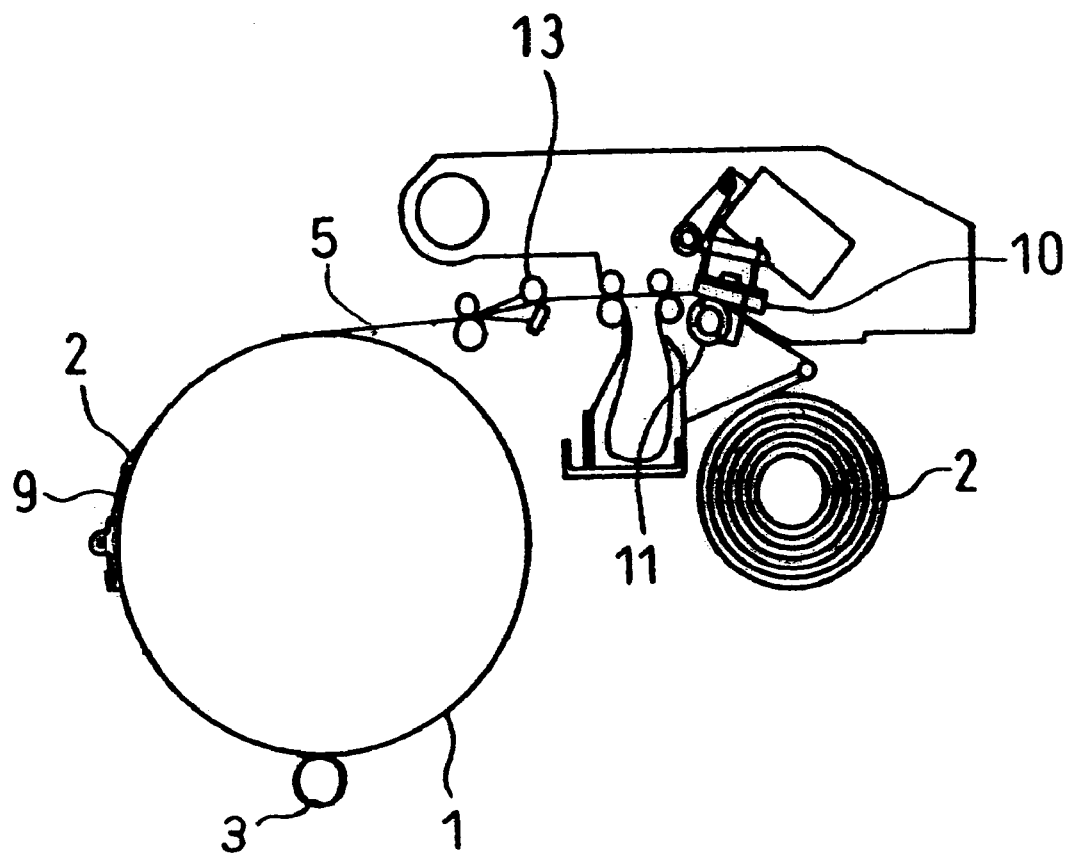
FIG. 1 is a schematic illustration of the portion for perforating a heat-sensitive stencil sheet in a stencil printing apparatus.

FIG. 1 is to schematically illustrate particularly the portion for perforating a stencil sheet in a stencil printing apparatus.

In a printing apparatus shown in FIG. 1, when a manuscript for printing is set at a read portion (not shown in the drawing), a read sensor reads the light and shade corresponding to the diagrams and letters in the manuscript as digital signals, and the signals are transmitted to thermal head 10. On the other hand, stencil sheet 2 set on a holder is fed up to thermal head 10 with feeding roller 11, and then perforated by the heat of thermal head 10 to form a perforated stencil sheet. Front end portion of the perforated stencil sheet 2 is held by clamp portion 9 and then wound around printing drum 1. Ink is squeezed out from the inside of printing drum 1 and transferred to a printing paper through perforated portions of the sheet 2 to complete printing. Printing paper is fed in synchronization with the rotation of printing drum 1, and a necessary number of sheets are continuously printed.

In FIG. 1, 3 is a press roller and 13 is a cutter.

Mechanism by which wrinkles occur when stencil sheet 2 is wound around printing drum 1 is described with reference to FIG. 2. In this connection, whereas printing drum 1 has a cylindrical shape in reality, it is shown in a developed state in FIG. 2 for the convenience of explanation.

Tension is applied on stencil sheet 2 toward the running direction in a printing apparatus. Accordingly, when the strength of stencil sheet 2 is insufficient or the sturdiness of the sheet is insufficient, a distortion occurs on a running stencil sheet, and thus wrinkles sometimes occur on the sheet in the machine direction when the sheet is wound around a printing drum. Besides, even when the strength of stencil sheet 2 is sufficient and the sheet is stiff, wrinkles sometimes occur at the time when the sheet is wound on a printing drum as described below.

Figure 2:
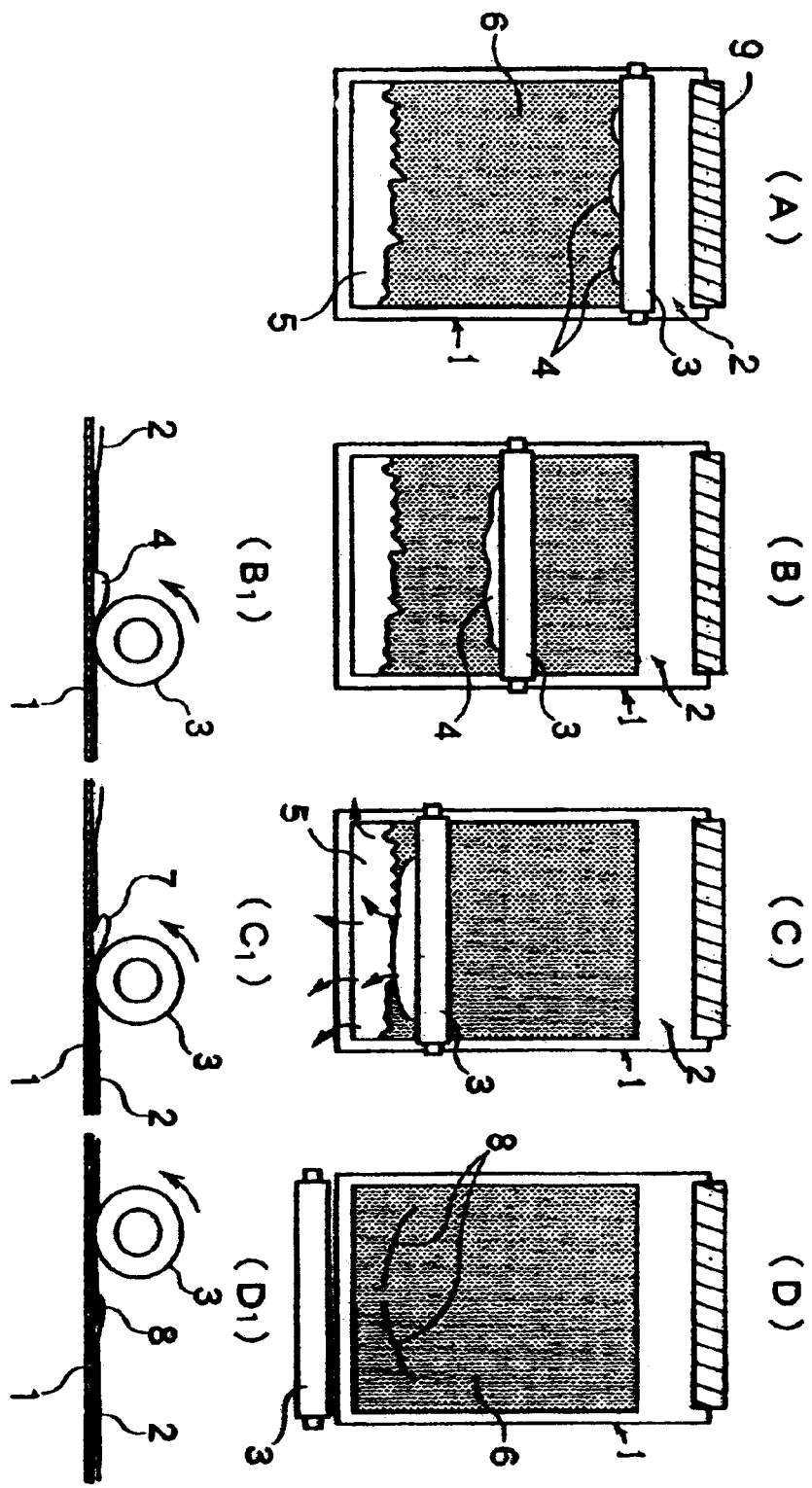
FIG. 2 is a schematic illustration of the mechanism by which wrinkles are formed on the sheet when a perforated heat-sensitive stencil sheet is wound around a printing drum.

That is, in FIG. 2, the front end of stencil sheet 2 is held by clamp portion 9 to place the sheet on printing drum 1 ((A)). At this time, stencil sheet 2 is placed on printing drum 1 such that printing surface 6, that is, the layer of a thermoplastic resin film becomes the upper surface of the sheet. Subsequently, the stencil sheet 2 is wound around the outer surface of printing drum 1 by the rotation of the printing drum 1 while being pressed with press roller 3, and finally whole printing surface 6 is placed on the drum ((B), (C), (D)). While the sheet is wound around the printing drum, not-contact portion 5 at which the stencil sheet 2 does not contact with the printing drum and has a air layer between the stencil sheet 2 and printing drum 1 exists at the other end of the placed stencil sheet 2.

However, when stencil sheet 2 is wound around printing drum 1, air bubble 4 (actually small air bubbles) enter between the stencil sheet 2 and the surface of printing drum 1, and air bubble 4 raises the stencil sheet 2 from the surface of printing drum 1. After the clamp portion passed the position of press roller 3, the stencil sheet 2 is pressed with press roller 3 to firmly adhere it on the surface of the drum while being rotated. On the other hand, the raised portion (that is, air bubble 4) gradually becomes large as printing drum 1 rotates, moves to the direction opposite to the rotation (($B_1$)) towards not-contact portion 5. When the air bubble became large, sheet folding 7 occurs (($C_1$)). The folded portion forms wrinkles 8 as the air inside is purged (($D_1$)).

In such mechanism by which wrinkles are formed at a stage of winding a sheet around a drum, the smaller the air bubble 4, the more hardly occurs a partial folding back of the stencil sheet 2.

On the other hand, in order to reduce the occurrence of a large air bubble, it is necessary to quickly purge small air bubbles from the space between stencil sheet 2 and printing drum 1.

In order to quickly purge air bubbles, it is necessary to prevent stencil sheet 2 from firmly sticking to the outer surface of printing drum 1 with an ink. The sticking of the sheet becomes small and weak with increase in the unevenness on the surface of a porous support of stencil sheet 2 which contacts with the outer surface of printing drum 1, that is, with decrease in the smoothness of the surface of the porous support.

Figure 3:
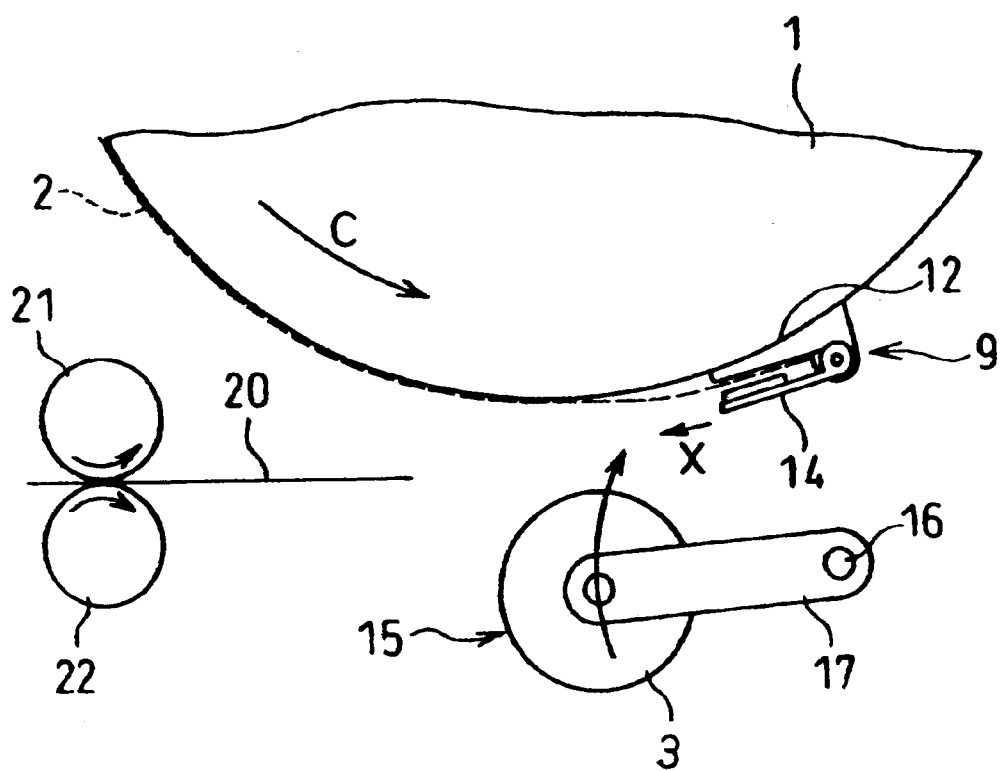
FIG. 3 is a schematic illustration of a part of printing portion in a stencil printing apparatus.

Next, the cause of elongation of a stencil sheet at printing is described with reference to FIG. 3. FIG. 3 is a schematic illustration of a part of printing portion in a representative stencil printing apparatus. In FIG. 3, printing drum 1 is provided with clamp portion 9 having fixed part 12 fixed at a part of the perimeter of the drum, and movable part 14 which is connected to the fixed part by a hinge and can be opened and closed with the hinge being its axis. They are designed such that stencil sheet 2 is fed with a sheet feeding device to opened clamp portion 9, and the front end of the sheet is clamped with clamp portion 9. Below printing drum 1, pressing device 15 for printing paper 20 is placed. Printing paper 20 is fed by the rotation of a pair of paper feeding rollers 21, 22 to a printing position at a predetermined timing, synchronized with a rotation of stencil sheet 2 placed on printing drum 1 as shown by arrow C. Supporting arm 17 is moved up and down with the axis 16 being its center by a member such as a cam (not shown in the drawing) for moving the arm up and down, synchronized with the feeding of the paper, and the printing paper 20 can be pressed against the stencil sheet 2 by free rotation type press roller supported by the arm to conduct printing. Printing drum 1 and pressing device 15 are set up on a frame (not shown in the drawing).

However, since press roller 3 is not rotated at the moment when the roller was pressed to a stencil sheet in such printing portion, a force in the direction opposite to that of the rotation of printing drum 1 is applied on printing paper 20 and the stencil sheet 2 in turn as shown by arrow X to cause elongation of the stencil sheet 2. Further, when running speed of printing paper 20 fed with paper feeding rollers 21, 22 becomes slower than the rotational speed of printing drum 1, a back tension is applied on printing paper 20. Even such a condition becomes a cause of producing elongation of stencil sheet 2.

When the smoothness of the surface of porous support of a stencil sheet is low, friction resistance between the porous support and the surface of a printing drum is generally small.

At the time of printing, a printing paper exerts the stencil sheet an external stress which is caused by the back tension of paper feeding rollers and acts as a force to elongate the stencil sheet, and a press roller also exerts the sheet a resisting force, and thus the stencil sheet is elongated.

At this time, when the press roller parted from the printing drum to avoid a convex in a clamp portion, the stress and resisting force added to the stencil sheet will vanish, and the elongated stencil sheet tends to return to an original length on the printing drum as in the case of elastic deformation.

However, when the friction resistance between the porous support and the surface of the printing drum is large, the stencil sheet difficultly returns to the original length and remains nearly as elongated.

On the other hand, when the friction resistance is small, returning of the stencil sheet to the original length is large, and thus elongation of the stencil sheet can be repressed in the end.

Further, against a certain external stress, the higher the tensile strength of a stencil sheet, the smaller is the elongation of the sheet at printing and the more hardly occurs wrinkles on the sheet.

Since the heat-sensitive stencil sheet of the present invention is adjusted, from the viewpoints described above, such that PPS smoothness of the surface of the porous support contacting with a printing drum is higher than a certain value and the sheet has a specific strength, occurrence of wrinkles on the sheet when the sheet is wound around a printing drum can be prevented, elongation of the sheet when a large number of paper sheets are printed is repressed, occurrence of wrinkles at the time of printing can be prevented, reproducibility of diagrams and letters on a manuscript in printed papers is excellent, and definition of images in printed portions is not reduced.

In the present invention, PPS smoothness of the surface of the porous support in a heat-sensitive stencil sheet is 0.9 μm or higher, preferably 1.1 μm or higher, and more desirably 1.7 μm or higher.

In this connection, PPS smoothness means smoothness determined by air-leak method using Parker Print-Surf type paper smoothness tester (produced by Messmer Buchel Co. Ltd.), and PPS smoothness in the present invention means the value determined when a film having a thickness of 0.1 to 10 μm and a PPS smoothness of 0.0 μm is pressed against the surface of the porous support of a stencil sheet.

While the film used for determination of the smoothness is not specifically limited as long as the film has a thickness mentioned above and a surface smoothness of 0.0 μm, usually a film of a thermoplastic resin used for producing the heat-sensitive stencil sheet is employed. As described above, when the PPS smoothness is determined, air leakage in the thickness direction of the porous support can be avoided by determining the smoothness while pressing a film against the surface of a porous support, and thus the surface smoothness of the porous support can accurately be determined.

When PPS smoothness of the surface of the porous support in a stencil sheet is lower than 0.9 μm, smoothness of the surface of a porous support of a stencil sheet is high and the sheet is liable to stick firmly to the surface of a printing drum, air bubbles occurred are difficultly purged, and thus wrinkles are ready to occur on the sheet when the sheet is wound around a printing drum thereby printing quality is degraded. Also, at the time of printing a large number of papers, elongation of a stencil sheet becomes large and thus reproducibility of a manuscript in printed papers is lowered.

While the upper limit of PPS smoothness of the surface of the porous support is not specifically limited, it is desirably adjusted to be lower than 8.0 μm from the viewpoint of the smoothness of the surface of the film of a stencil sheet.

In the present invention, KES flexural rigidity B value of a stencil sheet in the machine or cross direction is 0.02 g·cm²/cm or higher and preferably 0.03 to 0.10 g·cm²/cm. When the KES flexural rigidity B value is lower than 0.02 g·cm²/cm, stiffness of the stencil sheet is insufficient, wrinkles are readily occur when the sheet is wound around a printing drum and thus printing quality is degraded.

As used herein, the term "machine direction" means the running direction of a heat-sensitive stencil sheet when it is fed to a printing apparatus or the direction to which the sheet wound around a printing drum is rotated. The term "KES" also used in the present specification is an abbreviation for Kawabata's Evaluation System for Fabrics which system was devised by Professor Kawabata at Kyoto University and has widely been used as a method for determining hand feeling of woven or knitted fabrics in terms of a physical quantity.

In the present invention, wet tensile strength of a stencil sheet in the machine direction is 200 gf/cm or higher and preferably 300 gf/cm or higher. When wet tensile strength of the sheet in the mechanical direction is lower than 200 gf/cm, strength of a stencil sheet is insufficient and running of the sheet sometimes can not smoothly be conducted since a tension is applied on the sheet in its running direction in a printing apparatus. In an extreme case, tearing of the sheet occurs, or wrinkles sometimes occur on the sheet due to insufficient strength of the sheet when the sheet is wound around a printing drum.

Further, when a large number of papers are printed, elongation of a stencil sheet at printing becomes large, reproducibility of a manuscript in printed papers reduces, or wrinkles occur on the sheet at printing to cause a strained or unclear printing in the portions of wrinkles formed at printing, thereby reduces the definition of images on printed papers.

Heat-sensitive sheet for stencil printing of the present invention can be obtained by laminating a thermoplastic resin film and a porous support mainly composed of synthetic fibers.

As the thermoplastic resin film used in the present invention, a known film comprising a polyester, polyamide, polypropylene, polyethylene, polyvinyl chloride, polyvinylidene chloride, or their copolymer can be used, but a polyester film is especially preferable from the viewpoint of sensitivity to perforation.

As the polyester used for the thermoplastic resin film, a polyethylene terephthalate, copolymer of ethylene terephthalate with ethylene isophthalate, polyethylene-2,6-naphthalate, polyhexamethylene terephthalate, and copolymer of hexamethylene terephthalate with 1,4-cyclohexanedimethylene terephthalate can be mentioned.

The thermoplastic resin film can be prepared by a known T-die extrusion method, inflation method, or the like, and a stretched film, particularly, biaxially stretched film is preferable. The film can be obtained, for instance, by extruding a polymer through a T-die extrusion method on a cast drum to prepare an unstretched film, stretching the unstretched film with a group of heated rollers in the machine direction, feeding the film to a tenter or the like, and further stretching it in the cross direction. Unstretched film having a desired thickness can be prepared by adjusting the slit width of an orifice, amount of a polymer to be extruded, and the number of revolution of a cast drum. The film can be stretched at a desired stretching ratio by adjusting the rotational speed of a group of heated rollers and changing the preset width of a tenter.

Flame retardant, thermal stabilizer, antioxidant, UV absorber, antistatic agent, pigment, dye, organic lubricant such as aliphatic acid ester and wax, anti-foaming agent such as polysiloxane, and the likes can be added to the thermoplastic resin film, when necessary.

Thickness of the thermoplastic resin film is suitably decided depending on the sensitivity and others required of the stencil sheet, and usually adjusted to 0.1 to 10 μm, preferably 0.1 to 5 μm, and more desirably 0.1 to 3 μm. When thickness of the film exceeds 10 μm, perforatability sometimes reduces, but when it is less than 0.1 μm, the film forming stability occasionally lowers.

As the porous support used in the present invention and mainly composed of synthetic fibers, a paper prepared by a wet paper-making method, nonwoven fabric, woven fabric, or gauze screen from short fibers mainly comprising synthetic fibers can be used, but the nonwoven fabric is preferable.

As the synthetic fibers, known fibers of, for example, a polyester, polyamide, polyphenylenesulfide, polyacrylonitrile, polypropylene, polyethylene, or their copolymer is used. These synthetic fibers may be used in one kind of fibers, or two or more kind of fibers. Alternatively, the fibers may comprise natural fibers or regenerated cellulose fibers. However, polyester fibers are preferable from the viewpoint of thermal stability at the time of perforation. Even when two or more kind of fibers are used, the fibers preferably comprise at least 60% by weight of polyester fibers.

As the polyester used for the synthetic fibers, polyethylene terephthalate, polyethylene naphthalate, polycyclohexane-dimethylene terephthalate, and copolymer of ethylene terephthalate with ethylene isophthalate can be mentioned.

In these polymers, a flame retardant, thermal stabilizer, antioxidant, UV absorber, antistatic agent, pigment, dye, organic lubricant such as aliphatic acid ester and wax, and anti-foaming agent such as polysiloxane can be blended, when necessary.

As the nonwoven fabric, one prepared by a known direct melt spinning method such as a flash spinning method, melt blow spinning method, and spun bond method is used.

For instance, the nonwoven fabric is prepared through a melt blow spinning method by blowing heated air from the circumference of a spinneret when a melted polymer is extruded through the spinneret to make the extruded polymer into fine fibers by the heated air, and then collecting the fibers on a net conveyer arranged at a suitable position taking advantage of the air to form a web.

The web is sucked together with the heated air by a suction device provided at the net conveyer, and collected before individual fibers are completely solidified. That is, the web is collected in the state wherein the fibers are melt-adhered to one another. Extent of melt-adhesion of the fibers can be adjusted by suitably establish the distance between the spinneret and the net conveyer. Besides, basis weight of the web and fiber diameter of a single fiber can be optionally adjusted by properly controlling the amount of a polymer to be extruded, temperature of the heated air, flow rate of the heated air, and moving speed of the conveyer.

Fibers spun by a melt blow method are thinned by the pressure of heated air and solidified in not-oriented or low-oriented state. Thickness of fibers is not uniform, and a web is formed in the state where thick fibers and thin fibers are properly dispersed. Polymer extruded from a spinneret is solidified in the state of a low crystallinity close to amorphous, since the polymer is rapidly cooled from a melted state to a solid state in the atmosphere at room temperature.

Further, in order to impart an affinity for a printing ink to a nonwoven fabric, the surface of fibers which constitute the nonwoven fabric may be subjected to a chemical treatment by an acid, alkali, or the like, corona treatment, and low temperature plasma treatment, when necessary.

In the present invention, average diameter of fibers in the porous support is preferably 2 to 15 $\mu$m. When the average fiber diameter is smaller than 2 $\mu$m, wrinkles are liable to occur on a stencil sheet and unperforated portions are ready to be caused at the time of perforation, but when it exceeds 15 $\mu$m, unevenness is apt to be caused in passing of the ink.

Fiber basis weight (Metsuke) of the porous support is usually 2 to 30 g/m$^2$, preferably 2 to 20 g/m$^2$, and more desirably 5 to 15 g/m$^2$. When the basis weight exceeds 30 g/m$^2$, passability of an ink reduces and definition of images lowers, but when the basis weight is lower than 2 g/m$^2$, a strength sufficient as the support sometimes can not be obtained.

Laminating of a thermoplastic resin film and porous support to integrate them can be performed by adhesion using an adhesive (binder) under conditions wherein sensitivity of the thermoplastic resin film to perforation is not reduced, or by adhering the thermoplastic resin film and porous support under heating without using an adhesive.

As the adhesive, one of vinyl acetate type, acrylic type, vinyl chloride-vinyl acetate copolymer type, polyester type, and polyurethane type is used.

Also, as an adhesive of UV curing type, a mixture of a polyester type acrylate, urethane type acrylate, epoxy type acrylate, or polyol type acrylate with a photopolymerization initiator may be used. In this case, an adhesive comprising, as a main component, an urethane type acrylate is particularly preferable.

From the definition of printed images, it is preferable to directly adhere a thermoplastic resin film and porous support by heat-adhesion without using an adhesive.

Heat-adhesion is usually performed by "heat-pressing" in which the thermoplastic resin film and porous support are directly stuck to each other while being heated. While the method for the "heat-pressing" is not specifically limited, heat pressing with a heated roller is especially preferable from the viewpoint of processability.

In the present invention, it is particularly desirable to co-stretch an unstretched thermoplastic resin film and a nonwoven fabric in the state wherein they are adhered by heating. This heat-adhesion is preferably performed prior to the stage wherein a nonwoven fabric, and an unstretched film obtained by extrusion casting are stretched in the machine direction. Adhesion temperature is preferably between 80 and 170° C. and more preferably 100 to 150° C.

A thermoplastic resin film and nonwoven fabric are integrated and can satisfactorily be stretched without separating by co-stretching them under a heat-adhered condition. A reticulated nonwoven fabric preferable as the support can be formed since fibers in the nonwoven fabric are stretched at this time in the state wherein they are melt-adhered to one another at their interlocking or connecting points.

Further, a thermoplastic resin film and porous support are directly fixed to each other and can be integrated without using an adhesive by stretching them integratedly.

Method of co-stretching is not specifically limited, but a biaxial stretching is preferable, and it may be either a consecutive or simultaneous biaxial stretching. In the case of a consecutive biaxial stretching, it is general to stretch in the order of machine direction and then cross direction, but it may be performed in the reverse order.

Stretching ratio is not specifically limited and it is properly prescribed depending on the type of a thermoplastic resin to be used, perforation sensitivity required of a stencil sheet, and the like. However, about 2 to 8 times each in the machine direction and cross direction are usually suitable. Besides, it may be restretched in the machine, cross, or simultaneously machine and cross directions, after the biaxial stretching. Further, it is preferable to heat treating the sheet after the biaxial stretching. Heat treating temperature at this time is not specifically limited and it is properly selected depending on the type of a thermoplastic resin to be used. However, a temperature of 80 to 260° C. and a period of time of 0.5 to 60 seconds are usually suitable.

It is possible to stretch nonwoven fabrics in the state wherein many layers of nonwoven fabrics having a different or the same fiber diameter and basis weight are piled up. Crystallinity of fibers in a nonwoven fabric is preferably 20% or higher and desirably 25% or higher in particular. Relation between the melting point ($Tm_1$) of a thermoplastic resin film and the melting point ($Tm_2$) of a nonwoven fabric is preferably $Tm_1 \leq Tm_2$.

Peeling strength of a laminated and integrated thermoplastic film and porous support is preferably 1 g/25 mm or higher, more preferably 3 g/25 mm, and still more desirably 5 g/25 mm or higher. When the peeling strength is lower than 1 g/25 mm, peeling of a thermoplastic resin film from a porous support sometimes occurs when a stencil sheet is fed to a printing apparatus.

In order to prevent sticking at the time of perforation, a releasing agent is preferably coated on the surface of the film which constitutes the sheet in the present invention to form a layer of the releasing agent.

Coating of a releasing agent may be conducted at any one of a step prior to or after a biaxial stretching which is conducted after the unstretched film and unstretched nonwoven fabric described above were heat-adhered, a step between the first stretching and second stretching in a biaxial stretching, and a separate step after winding up. From the effect of preventing sticking, it is especially preferable to coat prior to stretching. While a method for coating a releasing agent is not specifically limited, it is preferable to coat by using a roll coater, gravuer coater, reverse coater, or bar (rod) coater.

As the releasing agent, a known agent comprising a silicone oil, silicone resin, fluorine type resin, or surface active agent can be used.

Various additives such as an antistatic agent, a heat resisting agent, an antioxidant, organic particles, inorganic particles, and a pigment can be mixed to the releasing agent. Further, various additives, for example, a dispersing agent, surface active agent, antiseptic agent, and defoaming agent may be added to a coating solution of the releasing agent for the purpose of improve the dispersibility.

Thickness of the layer of the releasing agent is preferably 0.005 to 0.4 $\mu$m and more desirably 0.01 to 0.4 $\mu$m from the viewpoint of runnability of a stencil sheet at the time of perforation and stain resistance of the thermal head.

BEST MODE FOR CARRYING OUT THE INVENTION

The present invention will be described in more detail with reference to Examples below. However, it should be understood that the scope of the present invention is by no means limited by such specific Examples. In the Examples, measurement and evaluation of various characteristics of stencil sheets were carried out by the following methods:

(1) PPS Smoothness of Surface of Porous Support

PPS smoothness of the surface of the porous support of a sample stencil sheet was determined by employing a Parker Print-Surf Roughness Tester ME-90 (produced by Messmer Buchel Co., Ltd.) at a clamping pressure of 500 KPa using a hard-backing while a thermoplastic film is being pressed against the surface of the porous support of the sheet such that wrinkles are not formed on the film. Determinations were carried out for optional 5 portions of the sample, the average value of the 5 determination values was calculated, and the average value thus obtained was assumed to be PPS smoothness of the surface of the porous support of a sample stencil sheet.

As the thermoplastic film, the same film having a film thickness of 2 $\mu$m as that used for a stencil sheet was employed. In this time, PPS smoothness of the film itself was 0.0 $\mu$m.

(2) KES Bending Rigidity B Value

KES bending rigidity B value of a sample heat-sensitive stencil sheet was determined by employing a pure bending characteristic tester (JTC-1) (produced by Japan Seiki Seisakusho (precision machine manufacturing) Co., Ltd.) according to the following procedures:

First, a heat-sensitive stencil sheet was cut by a single-edged razor to collect 10 sample sheets of 10 cm wide and 10 cm long. Next, a sample sheet was gripped with the distance between the stationary clamp of 20 cm long and the movable clamp being 10 cm, and subjected to pure bending in the range of curvature K=−2.5 to +2.5 ($cm^{-1}$) at a constant curvature changing rate of 0.1 ($cm^{-1}$/sec).

Figure 4:
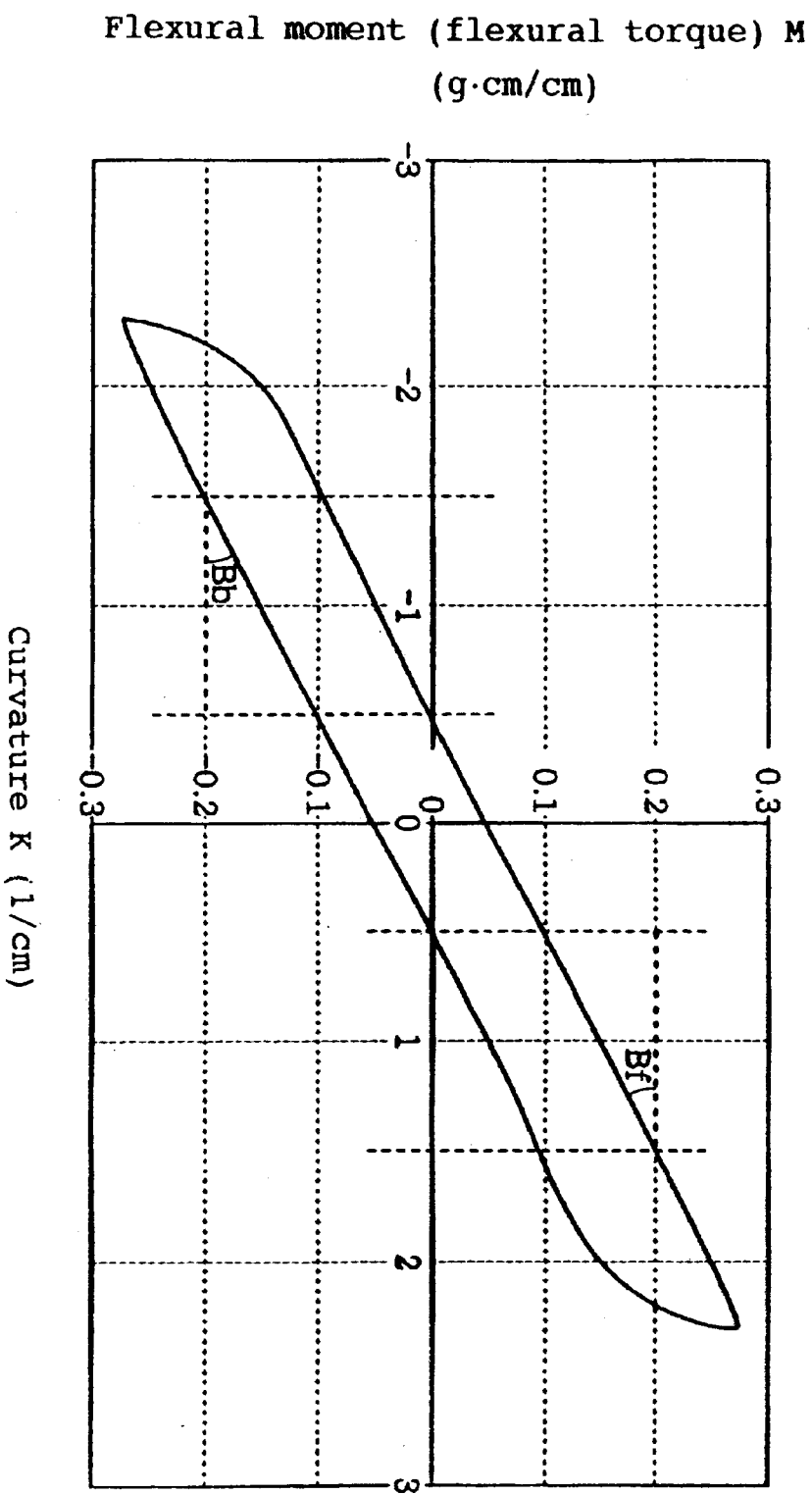
FIG. 4 is a graph showing a M-K curve used in the determination of KES bending rigidity B value of a heat-sensitive stencil sheet.

Relation between bending moment (bending torque) per unit length M (g·cm/cm) of a sample and curvature K ($cm^{-1}$) was plotted to obtain M-K curve shown in FIG. 4.

Inclination or slant (Bf) at a curvature K of between 0.5 and 1.5 (K=0.5~1.5) and the absolute value of the inclination (Bb) between −0.5 and −1.5 were determined, and the bending rigidity B value per unit length (g·cm$^2$/cm) was calculated by using the following equation:

$$B \text{ (g·cm}^2\text{/cm)} = (Bf+Bb)/2$$

Average value of bending rigidity B value of 10 sample sheets was calculated and the average value thus obtained was assumed to be KES bending rigidity B value.

(3) Wet Tensile Strength in the Machine Direction (Kgf/cm)

Heat-sensitive stencil sheet was cut by a single-edged razor to collect 10 sample sheets of 15 mm wide and 150 mm long. Next, the sample sheet was immersed in water so that the sheet became hydrophilic. The sheet was stretched until it ruptured by employing a "Universal Tester: Autograph AGS-Type D" (produced by Shimadzu Corp.) at a testing rate of 10 mm/min with the length of the test sheet being 100 mm, and the wet tensile strength was calculated by dividing the load at the time of 2% (2 mm) elongation by the width of the sample sheet. Average value of the wet tensile strength of 10 sample sheets was calculated and the average value thus obtained was assumed to be wet tensile strength in the machine direction.

(4) Average Fiber Diameter ($\mu$m)

Optional 10 portions of a nonwoven fabric in a sample heat-sensitive stencil sheet were photographed by an electron microscope (SEM) to obtain 10 photographs. Diameter of fibers in the 10 photographs were measured in such a manner that the diameter of optional 15 fibers per one photograph were measured to obtain diameter of 150 fibers in total, and the average fiber diameter was calculated.

(5) Fiber Basis Weight (g/m$^2$)

Weight of a heat-sensitive stencil sheet was measured by a precision balance and converted into the weight per m$^2$. Weight corresponding to that of the film was deducted from the converted weight and the weight thus obtained was assumed to be the fiber basis weight.

(6) Method for Evaluating Runnability of Sheet and Wrinkle Formation on Sheet at the Time when Sheet is Wound Around Printing Drum Heat-sensitive stencil sheet prepared was fed to a "Risograph" GR377 (produced by RISO KAGAKU CORPORATION), run toward a printing drum while being subjected to a blank perforation (printing ratio: 0%) and grid pattern perforation (printing ratio: 50%), and wound around the drum.

○: Excellent

Δ: While small wrinkles occurred on the sheet, it was such a level that the sheet was practically usable for printing.

x: Wrinkles occurred on the sheet and the sheet was incapable of being used.

(7) Method for Evaluating Elongation of Sheet at Printing

Heat-sensitive stencil sheet prepared was fed to a "Risograph" GR377 (produced by RISO KAGAKU CORPORATION), a grid pattern perforation was conducted, and then printing was carried out. Distance between optional 2 points in the top to bottom direction in a printed paper was measured, and the degree of change of 1000th printed paper sheet to the first printed paper sheet was calculated.

⊚: Considerably excellent (Degree of change was lower than 0.1%)

○: Good (Degree of change was 0.1% or higher but lower than 0.3%)

Δ: Practically usable level (Degree of change was 0.3% or higher but lower than 1.0%.)

x: Incapable of being used (Degree of change was higher than 1%.).

(8) Method for Evaluating Wrinkle Formation at Printing

Heat-sensitive stencil sheet prepared was fed to a "Risograph" GR377 (produced by RISO KAGAKU CORPORATION), a grid pattern perforation was conducted, and then printing was carried out. After 1000 paper sheets were printed, conditions of the sheet on the printing drum were visually inspected and evaluated by the following criteria:

○: No wrinkle occurred.

Δ: While minor wrinkle formation at printing was observed, the sheet was in a level of practically usable.

x: Wrinkle formation at printing was observed and the sheet was incapable of being used for printing.

EXAMPLE 1

Polyethylene terephthalate (η=0.60, Tm=254° C.) as a starting material was extruded by using a rectangular spinneret having 80 orifices each having a diameter of 0.35 mm at a spinneret temperature of 285° C. by a melt blow method to form fibers, and the fibers thus formed were collected on a conveyer while being dispersed to obtain a nonwoven fabric having a basis weight of 120 g/m² and average fiber diameter of 12.0 μm.

Next, a copolyester (η=0.65, Tm=210° C.) comprising 85% by mole of ethylene terephthalate and 15% by mole of ethylene isophthalate as a starting material was extruded by using an extruder having a screw diameter of 40 mm at a T die nozzle temperature of 270° C. and cast on a cooling drum having a diameter of 300 mm to obtain an unstretched film.

The nonwoven fabric described above was placed on the unstretched film, fed to a heating roller, and pressed at a roller temperature of 80° C. to prepare a laminated sheet.

This laminated sheet was stretched 3.5 times in the flowing direction between heated rollers at 90° C., fed to a tenter type stretching machine and stretched 4 times in the width direction at 95° C., and heat treated in the tenter at 160° C.

Wax type releasing agent was coated on the surface of the film at the entrance portion of the tenter by using a gravure coater such that the weight of the releasing agent after drying became 0.1 g/m² to prepare a heat-sensitive stencil sheet.

The sheet thus obtained had a fiber basis weight of 11 g/m², average diameter of fibers in the support of 6.0 μm, and a thickness of the thermoplastic resin film of 1.5 μm.

Further, PPS smoothness determined when a thermoplastic film was pressed against the surface of the support of the sheet was 1.52 μm, wet tensile strength in the machine direction of the sheet was 310 gf/cm, and KES bending rigidity B value in the machine and cross directions were 0.059 g·cm²/cm and 0.049 g·cm²/cm, respectively.

EXAMPLE 2

Heat-sensitive stencil sheet was prepared in the same manner as in Example 1 with the exception that a nonwoven fabric having a basis weight of 120 g/m² and average fiber diameter of 8.4 μm was used in place of the nonwoven fabric in Example 1.

The sheet thus obtained had a fiber basis weight of 11 g/m², average diameter of fibers in the support of 4.2 μm, and a thickness of the thermoplastic resin film of 1.5 μm.

Further, PPS smoothness determined when a thermoplastic film was pressed against the surface of the support of the sheet was 0.93 μm, wet tensile strength in the machine direction of the sheet was 302 gf/cm, and KES bending rigidity B value in the machine and cross directions were 0.064 g·cm²/cm and 0.051 g·cm²/cm, respectively.

EXAMPLE 3

Heat-sensitive stencil sheet was prepared in the same manner as in Example 1 with the exception that a nonwoven fabric having a basis weight of 80 g/m² and average fiber diameter of 12.2 μm was used in place of the nonwoven fabric in Example 1.

The sheet thus obtained had a fiber basis weight of 7 g/m², average diameter of fibers in the support of 6.1 μm, and a thickness of the thermoplastic resin film of 1.5 μm.

Further, PPS smoothness determined when a thermoplastic film was pressed against the surface of the support of the sheet was 1.58 μm, wet tensile strength in the machine direction of the sheet was 203 gf/cm, and KES bending rigidity B value in the machine and cross directions were 0.025 g·cm²/cm and 0.023 g·cm²/cm, respectively.

EXAMPLE 4

Heat-sensitive stencil sheet was prepared in the same manner as in Example 1 with the exception that a nonwoven fabric having a basis weight of 80 g/m² and average fiber diameter of 7.0 μm was used in place of the nonwoven fabric in Example 1.

The sheet thus obtained had a fiber basis weight of 7 g/m², average diameter of fibers in the support of 3.5 μm, and a thickness of the thermoplastic resin film of 1.5 μm.

Further, PPS smoothness determined when a thermoplastic film was pressed against the surface of the support of the sheet was 0.91 μm, wet tensile strength in the machine direction of the sheet was 211 gf/cm, and KES bending rigidity B value in the machine and cross directions were 0.028 g·cm²/cm and 0.024 g·cm²/cm, respectively.

EXAMPLE 5

Polyester film was provided by forming a single film in advance such that the film thickness became 1.7 μm at stretching.

Porous support prepared from natural fibers and synthetic fibers (polyester fibers) by using a wet papermaking process and having a basis weight of 10.5 g/m² was stuck on the film described above through a polyvinyl acetate resin in a coating amount of 0.8 g/m², and then a silicone type releasing agent was coated on the film surface to prepare a heat-sensitive stencil sheet.

PPS smoothness determined when a thermoplastic film was pressed against the surface of the support of the sheet thus obtained was 1.74 μm, wet tensile strength in the machine direction of the sheet was 350 gf/cm, and KES bending rigidity B value in the machine and cross directions were 0.028 g·cm$^2$/cm and 0.021 g·cm$^2$/cm, respectively.

Comparative Example 1

Heat-sensitive stencil sheet was prepared in the same manner as in Example 1 with the exception that a nonwoven fabric having a basis weight of 60 g/m$^2$ and average fiber diameter of 13.0 μm was used in place of the nonwoven fabric in Example 1.

The sheet thus obtained had a fiber basis weight of 5 g/m$^2$, average diameter of fibers in the support of 6.5 μm, and a thickness of the thermoplastic resin film of 1.5 μm.

Further, PPS smoothness determined when a thermoplastic film was pressed against the surface of the support of the sheet was 1.63 μm, wet tensile strength in the machine direction of the sheet was 154 gf/cm, and KES bending rigidity B value in the machine and cross directions were 0.021 g·cm$^2$/cm and 0.020 g·cm$^2$/cm, respectively.

Comparative Example 2

Heat-sensitive stencil sheet was prepared in the same manner as in Example 1 with the exception that a nonwoven fabric having a basis weight of 80 g/m$^2$ and average fiber diameter of 6.0 μm was used in place of the nonwoven fabric in Example 1.

The sheet thus obtained had a fiber basis weight of 7 g/m$^2$, average diameter of fibers in the support of 3.0 μm, and a thickness of the thermoplastic resin film of 1.5 μm.

Further, PPS smoothness determined when a thermoplastic film was pressed against the surface of the support of the sheet was 0.72 μm, wet tensile strength in the machine direction of the sheet was 210 gf/cm, and KES bending rigidity B value in the machine and cross directions were 0.030 g·cm$^2$/cm and 0.026 g·cm$^2$/cm, respectively.

Comparative Example 3

Nonwoven fabric having a basis weight of 80 g/m$^2$ and an average fiber diameter of 8.2 μm was prepared in the same manner as in Example 1.

Heat-sensitive stencil sheet was prepared in the same manner as in Example 1 with the exception that nonwoven fabric described above was used and stretched in the flowing direction at 100° C.

The sheet thus obtained had a fiber basis weight of 7 g/m$^2$, average diameter of fibers in the support of 4.1 μm, and a thickness of the thermoplastic resin film of 1.5 μm.

Further, PPS smoothness determined when a thermoplastic film was pressed against the surface of the support of the sheet was 0.93 μm, wet tensile strength in the machine direction of the sheet was 232 gf/cm, and KES bending rigidity B value in the machine and cross directions were 0.017 g·cm$^2$/cm and 0.012 g·cm$^2$/cm, respectively.

Comparative Example 4

Heat-sensitive stencil sheet was prepared in the same manner as in Example 1 with the exception that a nonwoven fabric having a basis weight of 120 g/m$^2$ and average fiber diameter of 6.0 μm was used in place of the nonwoven fabric in Example 1.

The sheet thus obtained had a fiber basis weight of 11 g/m$^2$, average diameter of fibers in the support of 3.0 μm, and a thickness of the thermoplastic resin film of 1.5 μm.

Further, PPS smoothness determined when a thermoplastic film was pressed against the surface of the support of the sheet was 0.71 μm, wet tensile strength in the machine direction of the sheet was 340 gf/cm, and KES bending rigidity B value in the machine and cross directions were 0.070 g·cm$^2$/cm and 0.055 g·cm$^2$/cm, respectively.

Characteristics of the sheets obtained by Examples 1 to 5 and Comparative Examples 1 to 4 are shown together in Table 1. From Table 1, it can be understood that wrinkle formation on a heat-sensitive stencil sheet at the time of winding the sheet around a printing drum, elongation of the sheet at the time of printing, and wrinkle formation on the sheet at printing can simultaneously be avoided by using the heat-sensitive stencil sheet of the present invention.

TABLE 1

| | Fiber basis weight (g/m$^2$) | Average fiber diameter (μm) | Film thickness (μm) | Wet tensile strength (gf/cm) | KES bending rigidity (g·cm$^2$/cm) MD | KES bending rigidity (g·cm$^2$/cm) CD | PPS smoothness (μm) | Wrinkle formation at winding around printing drum | Elongation at printing | Wrinkle formation at printing |
|---|---|---|---|---|---|---|---|---|---|---|
| Example 1 | 11 | 6.0 | 1.5 | 310 | 0.059 | 0.049 | 1.52 | ○ | ⊙ | ○ |
| Example 2 | 11 | 4.2 | 1.5 | 302 | 0.064 | 0.051 | 0.93 | Δ | ○ | ○ |
| Example 3 | 7 | 6.1 | 1.5 | 203 | 0.025 | 0.023 | 1.58 | ○ | ○ | ○ |
| Example 4 | 7 | 3.5 | 1.5 | 211 | 0.028 | 0.024 | 0.91 | Δ | Δ | ○ |
| Example 5 | 10.5 | — | 1.7 | 350 | 0.028 | 0.021 | 1.74 | ○ | ⊙ | ○ |
| Compara. Example 1 | 5 | 6.5 | 1.5 | 154 | 0.021 | 0.020 | 1.63 | x | x | x |
| Compara. Example 2 | 7 | 3.0 | 1.5 | 210 | 0.030 | 0.026 | 0.72 | x | x | Δ |
| Compara. Example 3 | 7 | 4.1 | 1.5 | 232 | 0.017 | 0.012 | 0.93 | x | ○ | ○ |

TABLE 1-continued

| | Fiber basis weight (g/m²) | Average fiber diameter (μm) | Film thickness (μm) | Wet tensile strength (gf/cm) | KES bending rigidity (g·cm²/cm) MD | KES bending rigidity (g·cm²/cm) CD | PPS smoothness (μm) | Wrinkle formation at winding around printing drum | Elongation at printing | Wrinkle formation at printing |
|---|---|---|---|---|---|---|---|---|---|---|
| Compara. Example 4 | 11 | 3.0 | 1.5 | 340 | 0.070 | 0.055 | 0.71 | X | ○ | ○ |

Note: Criteria for Evaluation
Wrinkle formation at winding a stencil sheet around a printing drum/wrinkle formation at printing:
○: Excellent
Δ: While small wrinkles occurred on the sheet, it was such a level that the sheet was practically usable for printing.
x: Wrinkles occurred on the sheet and the sheet was incapable of being used.
Elongation of the sheet at printing:
⊙: Considerably excellent (Degree of change was lower than 0.1%)
○: Good (Degree of change was 0.1 % or higher but lower than 0.3%)
Δ: Practically usable level (Degree of change was 0.3 % or higher but lower than 1.0%.)
x: Incapable of being used (Degree of change was higher than 1%.)

Since the heat-sensitive sheet for stencil printing of the present invention has a wet tensile strength in the machine direction of 200 gf/cm or higher, KES bending rigidity B value in the machine or cross direction of 0.02 g·cm²/cm, and a PPS smoothness at the porous support side of the sheet of 0.9 μm or higher, wrinkles do not occur on the sheet at the time of winding the sheet around a printing drum, elongation of the sheet when a large number of paper sheets are printed is repressed, occurrence of wrinkles on the sheet at the time of printing can be prevented, and reproducibility of a manuscript in printed paper sheets is excellent.

What is claimed is:

1. A heat-sensitive sheet for stencil printing comprising a laminate of a thermoplastic resin film and a porous support mainly composed of synthetic fibers, the sheet having a wet tensile strength in the machine direction of 200 gf/cm or higher, a KES bending rigidity B value in the machine or cross direction of 0.02 g·cm²/cm or higher, and a PPS smoothness determined when a film is pressed against the surface of the porous support of the sheet of 0.9 μm or higher.

2. The heat-sensitive sheet for stencil printing according to claim 1 wherein the sheet has a wet tensile strength in the machine direction of 300 gf/cm or higher.

3. The heat-sensitive sheet for stencil printing according to claim 1 wherein the sheet has a KES bending rigidity B value in the machine or cross direction of 0.03 to 0.10 g·cm²/cm.

4. The heat-sensitive sheet for stencil printing according to claim 1 wherein the sheet has a PPS smoothness determined when a film is pressed against the surface of the porous support of the sheet of 1.1 to 8.0 μm.

5. The heat-sensitive sheet for stencil printing according to claim 1 wherein the thermoplastic resin film is a polyester film.

6. The heat-sensitive sheet for stencil printing according to claim 1 wherein the thermoplastic resin film has a thickness of 0.1 to 10 μm.

7. The heat-sensitive sheet for stencil printing according to claim 1 wherein the porous support is a nonwoven fabric mainly composed of polyester fibers.

8. The heat-sensitive sheet for stencil printing according to claim 1 wherein the average diameter of the fibers in the porous support is 2 to 15 μm.

9. The heat-sensitive sheet for stencil printing according to claim 1 wherein the porous support has a fiber basis weight of 2 to 30 g/m².

10. The heat-sensitive sheet for stencil printing according to claim 1 wherein the sheet has a peeling strength of 1 g/25 mm or higher.

* * * * *